J. M. C. BRYANT.
AEROPLANE.
APPLICATION FILED APR. 26, 1911.
1,123,479.
Patented Jan. 5, 1915.
10 SHEETS—SHEET 4.
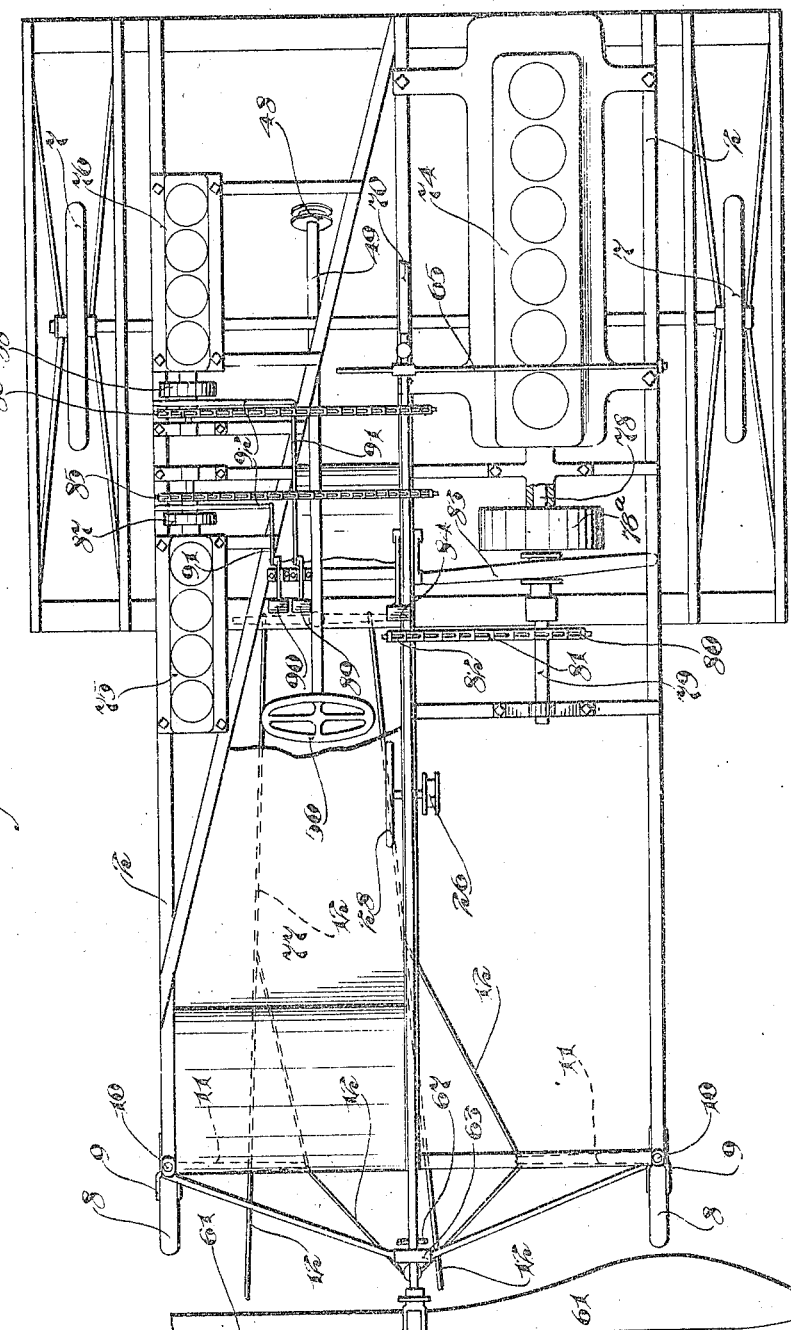

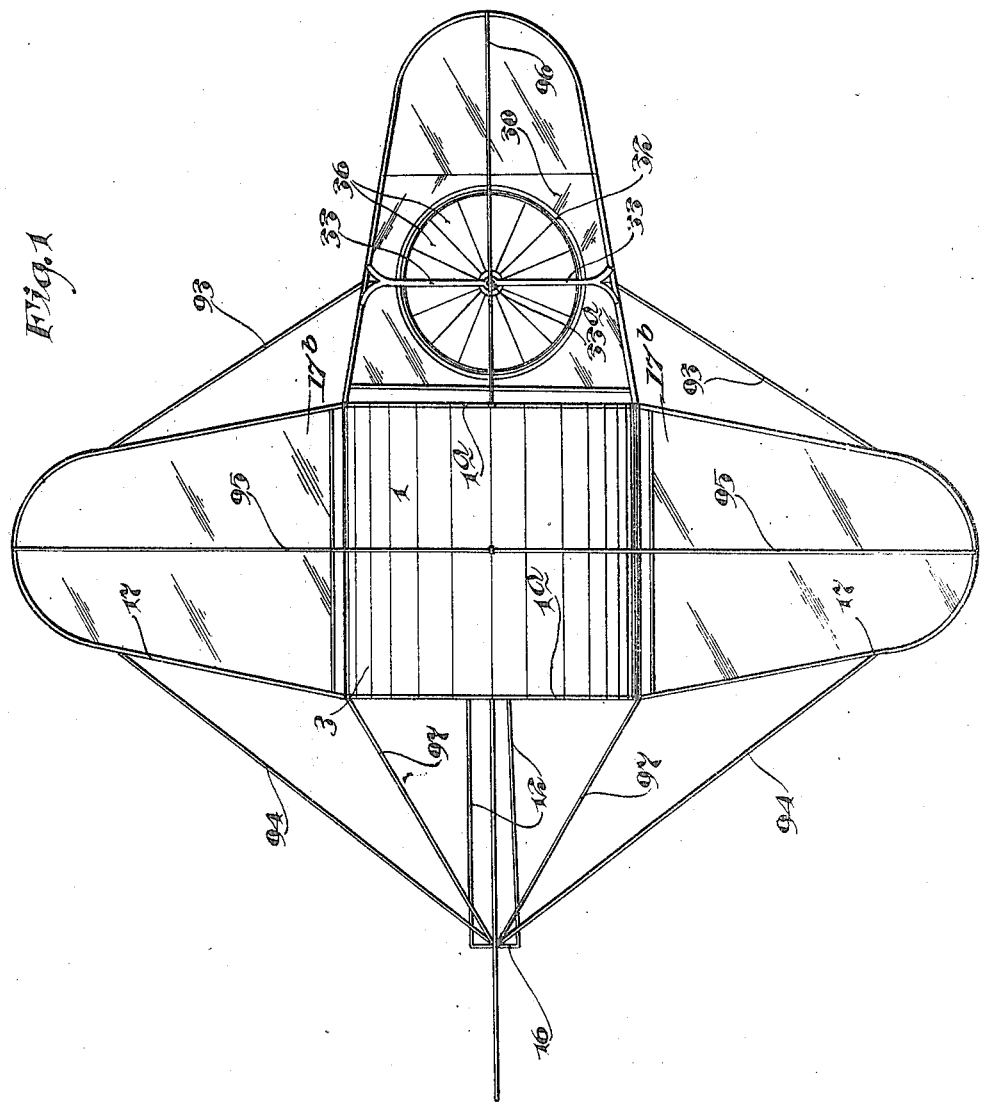

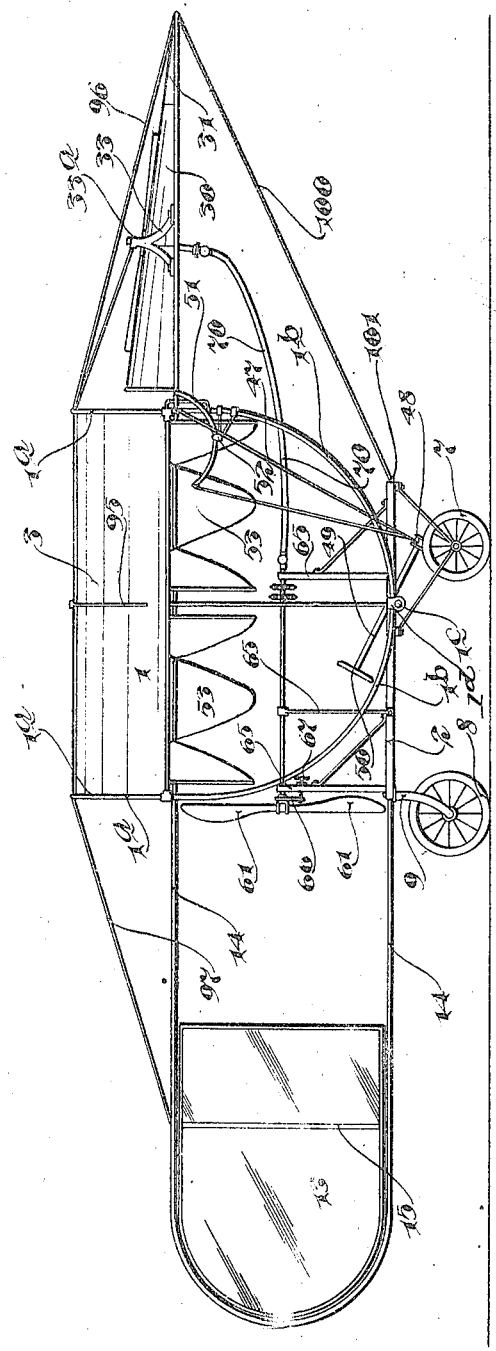

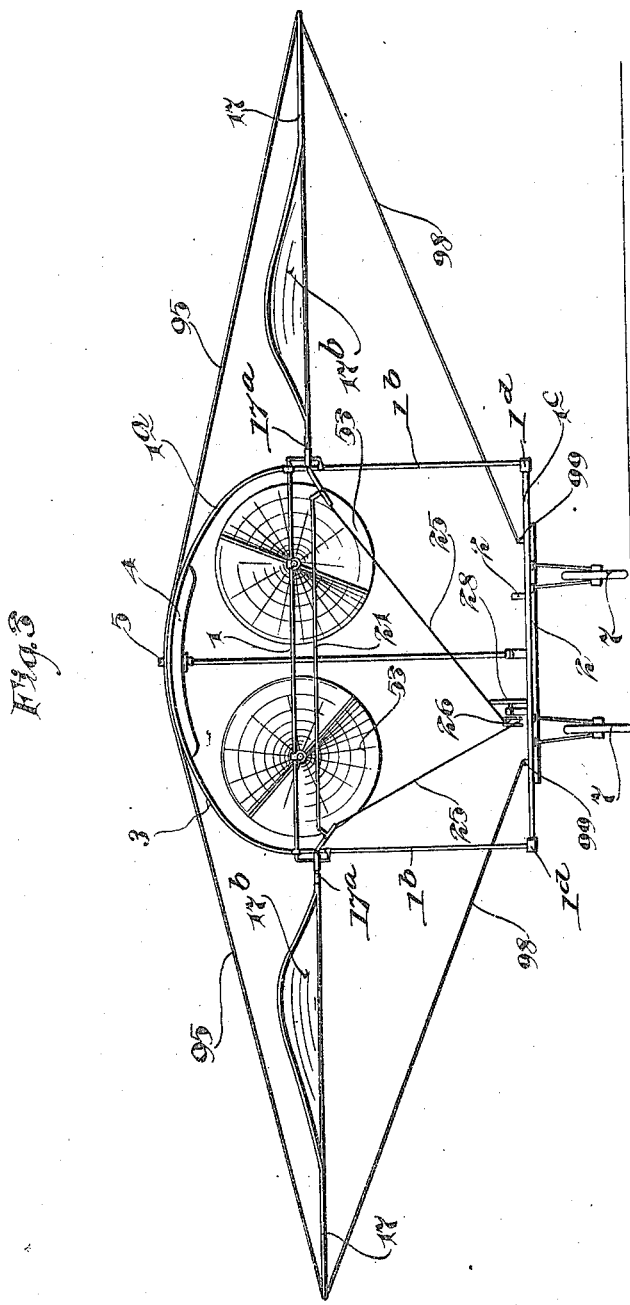

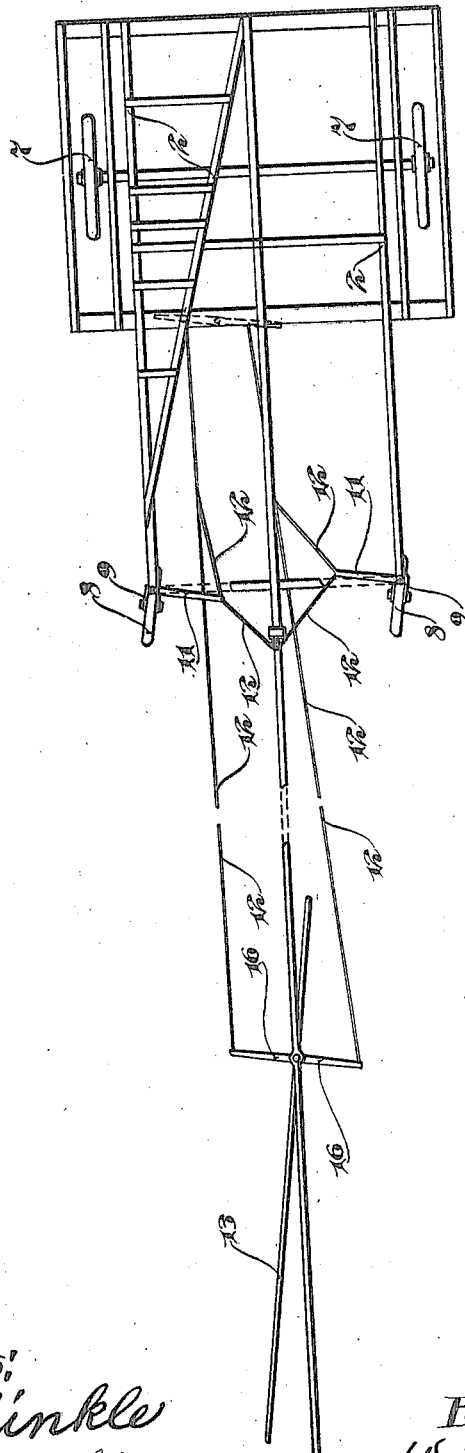

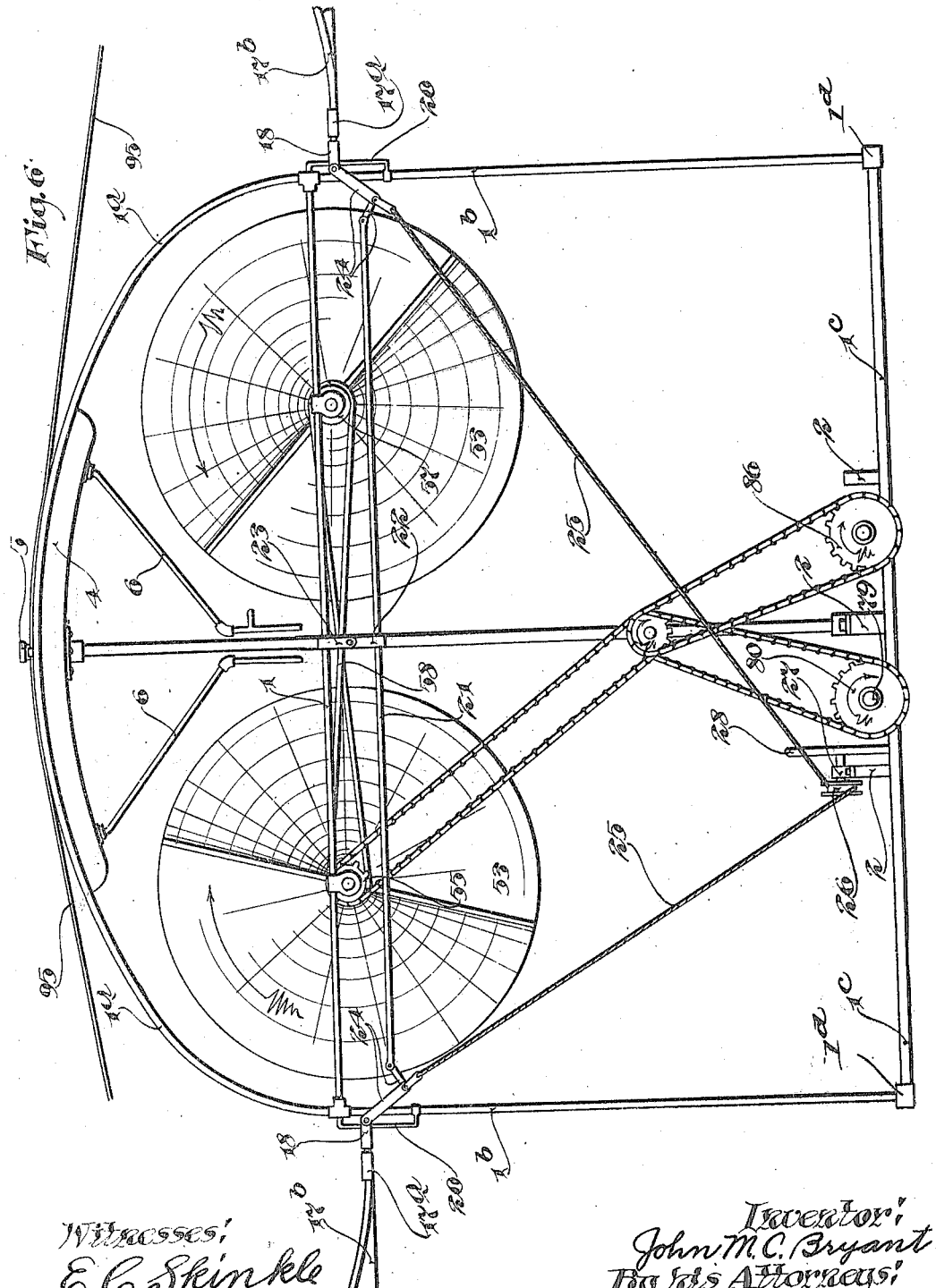

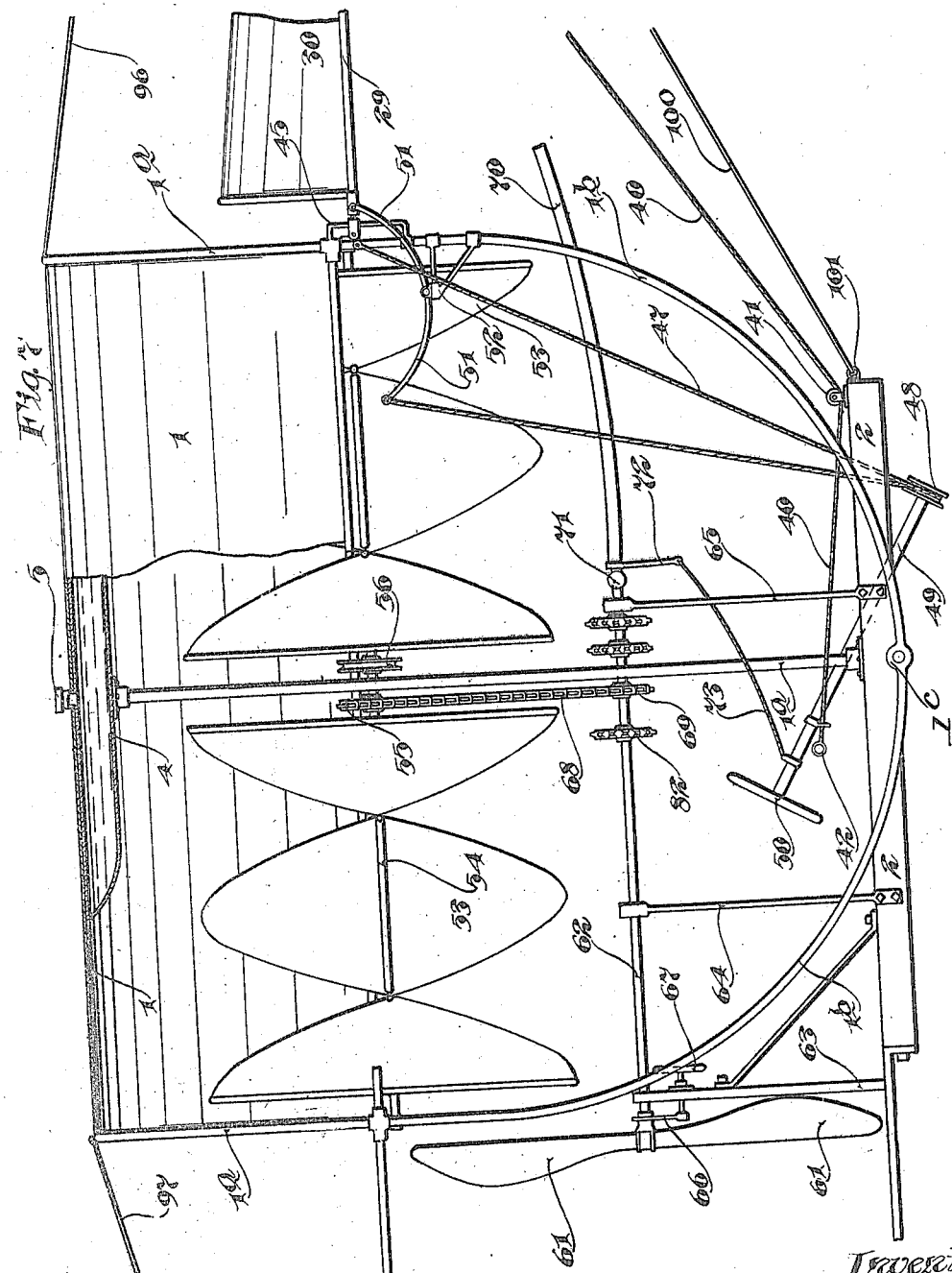

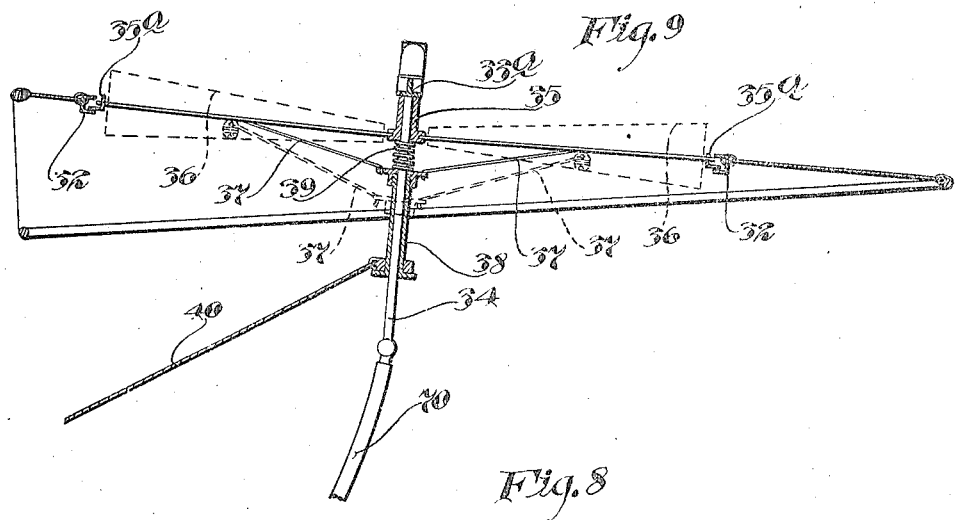
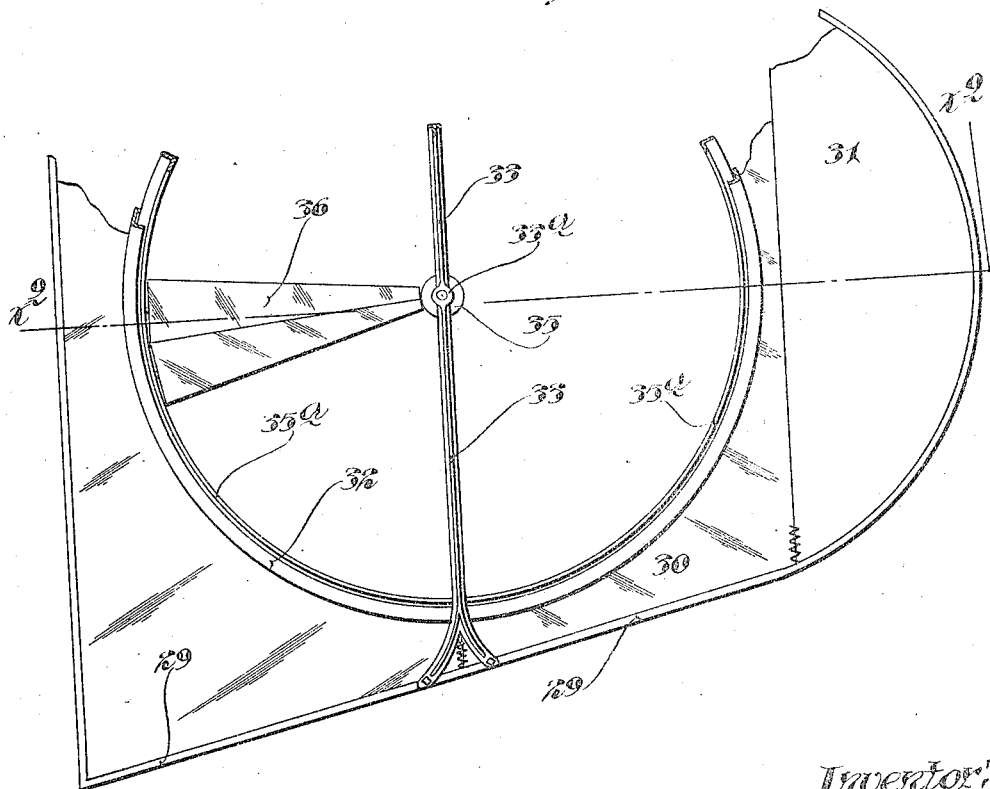

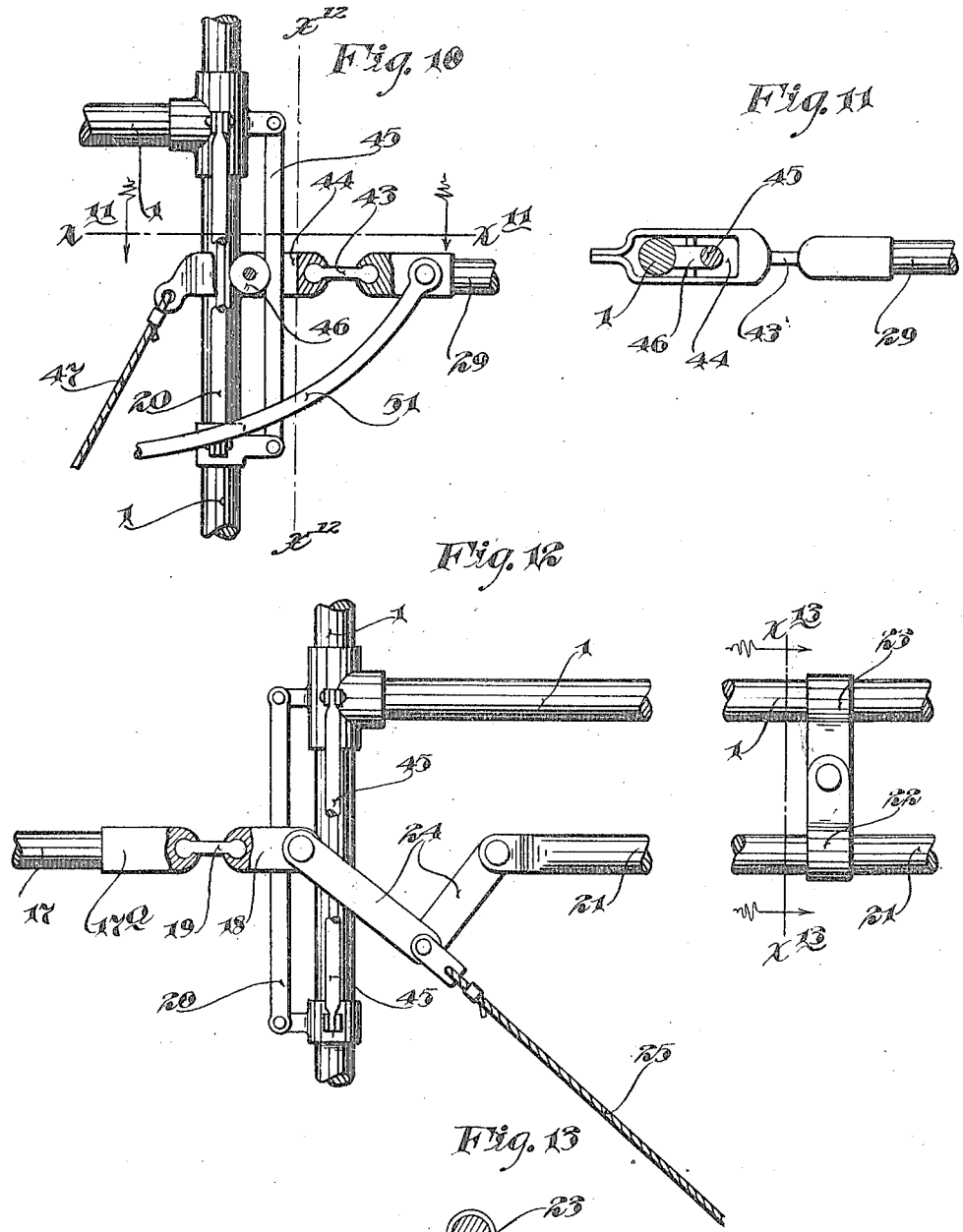

J. M. C. BRYANT.
AEROPLANE.
APPLICATION FILED APR. 26, 1911.
1,123,479.
Patented Jan. 5, 1915.
10 SHEETS—SHEET 10.
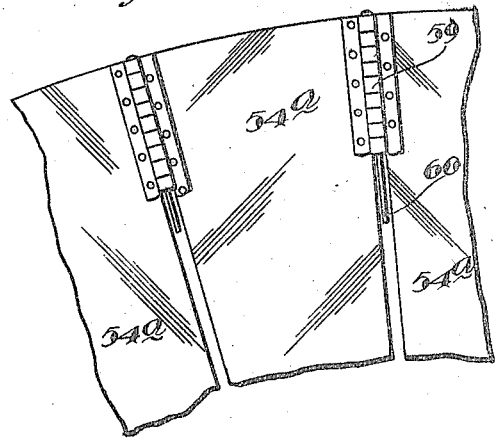
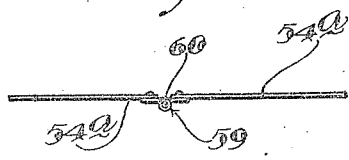
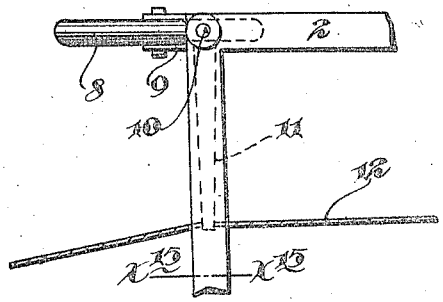
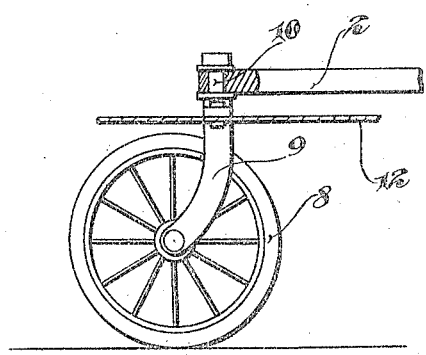
Witnesses:
E. C. Skinkle
A. H. Opsahl.
Inventor:
John M. C. Bryant,
By his Attorneys
Williamson Merchant

UNITED STATES PATENT OFFICE.

OHN M. C. BRYANT, OF BINGHAMTON, NEW YORK, ASSIGNOR OF ONE-FOURTH TO JOHN A. STILL, OF BRADFORD, PENNSYLVANIA, AND ONE-FOURTH TO JOSEPH L. HENRY, OF ROCHESTER, NEW YORK.

AEROPLANE.

1,123,479.  Specification of Letters Patent.  Patented Jan. 5, 1915.

Application filed April 26, 1911. Serial No. 623,455.

*To all whom it may concern:*

Be it known that I, JOHN M. C. BRYANT, a citizen of the United States, residing at Binghamton, in the county of Broome and State of New York, have invented certain new and useful Improvements in Aeroplanes; and I do hereby declare the following to be a full, clear, and exact description of the invention, such as will enable others skilled in the art to which it appertains to make and use the same.

My invention has for its object to provide an improved flying machine, and to this end, generally stated, the invention consists of the novel devices and combinations of devices hereinafter described and defined in the claims.

More specifically stated, the improved flying machine involves primarily the structure of an aeroplane, but secondarily includes certain of the principles of the helicopter.

The monoplane type of aeroplane is employed in the preferred form of the device. The body frame has an arched metal top preferably constructed of bowed tubular metal ribs, and an arched main or center plane of hood-like form is extended longitudinally of the machine and secured to the arched top of the said body frame. The wing planes extend from the opposite edges of the arched main or center plane and their inner front portions are connected to the body frame by sliding joints permitting vertical adjustments thereof so that the said wings may be deflected without warping or unduly straining the wing frames. Immediately under the arched center plane or hood is a pair of long reversely driven spiral propellers, and below and at the rear of these spiral propellers is a main propeller. The rudder is located at the rear of the main propeller. An elevator plane is supported in front of the long spiral propellers, and means is provided for vertically adjusting the rear portion thereof, for varying the angle of said elevator plane, as required, to control the ascent or descent of the machine under forward movement. Incorporated in the elevator plane is an elevator propeller of novel construction and the employment of which embodies the helicopter principles in the aeroplane. Several engines, preferably of the explosive type are carried by the body frame and are provided with driving connections to the several propellers.

The preferred form of the improved machine is illustrated in the accompanying drawings wherein like characters indicate like parts throughout the several views.

Referring to the drawings, Figure 1 is a plan view of the complete machine; Fig. 2 is a side elevation of the same; Fig. 3 is a front elevation of the machine; Fig. 4 is a plan view with some parts broken away and with the planes removed; Fig. 5 is a plan view of the carriage showing the same disconnected from the machine body; Fig. 6 is a front elevation of the machine with portions of the planes broken away and with the carriage removed; Fig. 7 is a side elevation with some parts broken away showing the parts illustrated in Fig. 6; Fig. 8 is a fragmentary plan view showing the elevator plane and the elevator propeller which is incorporated therein; Fig. 9 is a vertical section taken on the line $x^9\ x^9$ of Fig. 8; Fig. 10 is a detailed view chiefly in side elevation but with some parts broken away and some parts sectioned, showing a portion of the body frame and the means for adjusting the elevator plane; Fig. 11 is a horizontal section taken on the line $x^{11}\ x^{11}$ of Fig. 10; Fig. 12 is a vertical section taken on the line $x^{12}\ x^{12}$ of Fig. 10, some parts being broken away and showing also the adjustable connection between one of the wing planes and the body plane; Fig. 13 is a vertical section taken on the line $x^{13}\ x^{13}$ of Fig. 12; Fig. 14 is a detail in plan showing the connection between one of the carriage wheels and the carriage frame; Fig. 15 is a vertical section taken on the line $x^{15}\ x^{15}$ of Fig. 14, some parts being broken away; Fig. 16 is a detail illustrating the preferred construction of the spiral propellers; and Fig. 17 is an edge elevation showing one of the hinge connections between sections of the spiral propeller.

The body frame and the carriage frame of the machine are both light skeleton structures, preferably made from aluminum tubing suitably braced and the two frames being arranged so that, in effect, they form a single skeleton structure. The body frame is indicated as an entirety by the numeral 1 and the carriage frame is indicated as an entirety by the numeral 2. The former is provided with curved top ribs 1ᵃ to which a hood-like curved centerplane 3 is laced, or otherwise secured, so that except for its own flexibility, it will remain stationary in respect to the said ribs. This centerplane 3 extends longitudinally of the machine and, preferably, a fuel tank 4 of curved form is secured to the body frame 1 immediately below the central portion of the centerplane 3. This tank 4 is shown as provided with a normally closed filling nipple 5 on top and with depending oil delivery pipes 6 which lead to the various engines hereinafter described, (see particularly Figs. 6 and 7).

The carriage frame 2 is supported, when the machine rests upon the ground, by four light wheels, to-wit, two front wheels 7 and two rear wheels 8. The two rear wheels 8 are the steering wheels and are shown as journaled to wheel brackets 9 (see Figs. 2, 5, 14, and 15), that are pivoted at 10 to the rear corners of said carriage frame. The wheel brackets 9 are provided with inwardly extended arms 11 connected to steering cables 12.

The aeroplane rudder 13 which is at the rear of the machine, is pivoted to a light yoke-like rudder support 14 which, at its front portion, is rigidly attached to the frames 1 and 2. The pivot shaft 15 of this rudder is provided with oppositely projecting arms 16 to which the rear ends of the steering cables 12 are attached, as best shown in Fig. 5. In this way the steering wheels and the rudder are connected for simultaneous steering movements so that when the machine alights upon the ground, the steering wheels will be properly positioned to continue the movement of the machine without undue strain upon the wheels. This feature is highly important.

The wing planes 17 which, of course, are located, one on each side of the center or body plane 3, are formed by light metal marginal frames and suitable canvas or fabric covering such as is usually employed. The marginal frames of the wing planes 17, at their rear inner portions are fixedly attached to the body frame 1, but at their front inner portions they are adjustably attached thereto and to this end are shown as terminating in heads 17ᵃ (see Figs. 6 and 12), which, in turn, are connected for double pivotal action to supplemental heads 18, by means of links 19. The links 19 are shown as provided with rounded heads that are loosely seated in the said heads 17ᵃ and 18. The heads 18 are connected for sliding movements on short vertical guide bars 20 that are off-set from but rigidly secured to upright front posts of the body frame 1.

The heads 18, and hence, the front inner portions of the wing planes 17 are adapted to be given simultaneous vertical adjustments in reverse directions through connections best shown in Figs. 6 and 12, which connections comprise the following parts: A long tubular lever bar or walking beam 21 is provided with a fixed central lug 22 that is pivoted to a supporting lug 23 rigidly secured on a front transverse bar of the body frame 1. The ends of the walking beam 21 are connected by toggles 24 to the said adjustable heads 18 and the intermediate joints of these toggles 24 are connected to the upper ends of a wing adjusting cable 25. The lower intermediate portion of the wing adjusting cable 25 is wound upon and operated by a sheave 26 (see Figs. 3 and 6), the shaft of which is journaled in a suitable bearing 27 on the lower portion of the body frame and is provided with an operating wheel 28. By rotation of the wheel 28 and sheave 26 the inner front portions of the wing plane 17 will be simultaneously adjusted in reverse directions, that is, when one is tilted down, the other is tilted up, so as to thereby control the machine in guiding, balancing, and turning corners or when being brought into contact with trick winds. The same control of the wings may be accomplished by taking hold directly of the walking beam 21, so that there are always available two sources of control of the said wings. Both wings 17 at their front portions are preferably dished or upwardly bulged at 17ᵇ so that they will catch the air with greater force and lifting efficiency under forward movement.

The elevator of the machine is in the form of a plane located at the front of the machine and ahead of the wings and central or bottom plane and having its rear portion vertically adjustable. This elevator plane is made up of a marginal frame 29 and the plane surface which is attached to the said frame is made up preferably of a thin aluminum plate 30 and a light canvas section 31, both of which are slightly arched. The aluminum plate 30 is provided with a large opening lined with and secured to a light aluminum channel 32. The channel 32 is spanned by a light aluminum bridge bar 33 carrying central hub 33ᵃ.

The numeral 34 indicates a short approximately vertical shaft which, at its upper end, is journaled in but held against endwise movements in respect to the hub 33ᵃ of the bridge bar 33.

The numeral 35 indicates the hub and the numeral 35ᵃ the rim of an approximately horizontal elevator propeller that is provided with a multiplicity of angularly adjustable propeller blades 36. The wheel hub 35 is rigidly secured to the shaft 34 immediately below the bearing hub 33ᵃ and the wheel rim 35ᵃ is guided by the channel 32. Rotation of the shaft 34 revolves the said elevator propeller. For angularly adjusting the propeller blades 36, oblique ribs 37 are attached to one edge thereof at their outer ends and at the inner ends are pivotally attached to an adjusting sleeve 38 that is mounted to slide on the shaft 34. A coiled spring 39 anchored to the wheel hub 35 and the sleeve 38 exerts a force tending to lift said stem 38 and through the rods 37 normally yieldingly holds the propeller blades in, or approximately in, a common plane, or in other words, in closed positions. The propeller blades are open or set in oblique positions by pulling downward on the sleeve 38 and this is readily accomplished through a propeller adjusting cable 40 attached to the said sleeve at its upper end (see Fig. 9) and at its lower end extended under a guide sheave 41 on the base of the body frame 1 and terminates in a hand piece 42 within reach of the operator (see Fig. 7).

For adjusting the rear portion of the elevator plane, the rear ends of the side bars of its frame 29 are pivotally connected by links 43 (see Fig. 10), to vertically adjustable heads 44 mounted to slide on vertical guide bars 45 spaced from but rigidly secured to the vertical front bars of the body frame 1. The heads 44 are shown as provided with anti-friction wheels 46 that work between the bars 45 and adjacent frame posts. The adjustable heads 44 are attached to the upper ends of elevator cables 47, the lower portions of which are joined and wound upon and controlled by a sheave 48 carried by the lower end of an oblique operating post 49 mounted in suitable bearings on the base of the body frame 1 and provided at its rear upper end with an operating wheel 50, within reach of the operator.

The heads at the rear ends of the elevator frame 29 are pivotally connected to curved levers or rocker arms 51 that are intermediately pivoted to brackets 52 on the front posts or bars of the frame 1 (see Figs. 7 and 10). The rear ends of the rocker arms 51 are attached to the other ends of the elevator cables 47. By the cable and lever connections just described, the entire rear end portion of the elevator plane may, as is evident, be positively raised by rotation of the steering post 49 in one direction and positively drawn downward by rotation of the said post 49 in the opposite direction.

The aeroplane is arranged to be driven forward by three propellers, two of which are in the form of long spirals located immediately under and partly inclosed at its top and sides by the hoodlike main or central plane 3. The third or main propeller is preferably located below and at the rear of the long spiral propellers and is in the form of a reversible blade propeller of any of the well known types. The long spiral twin propellers 53 are carried by shafts 54 journaled in suitable bearings in the front, intermediate and rear cross bars of the body frame 1, and, preferably, each such propeller is made in two sections slightly spaced at their adjacent ends to afford space on one of the said shafts for a sprocket 55 and a sheave 56 (see Fig. 7) and on the other shaft for a sheave 57. One of the spiral propellers has a right hand and the other a left hand turn and they are connected for simultaneous rotations in reverse directions, by means of a crossed belt 58 (see Fig. 6) which runs over the sheaves 56 and 57. These spiral propellers may be constructed in a very great many different ways but should be very light and yet strong, and to make the same collapsible for shipping purposes, they may be made up of sections 54ª (see Figs. 16 and 17) connected by hinge lugs 59 pivotally connected on long rods 50 extended radially from and secured to the said shafts 54. The sections 54ª may be made from very light aluminum sheets.

The main, or reversible propeller 61 is carried by the rear end of the main driving shaft 62 mounted in suitable bearing brackets 63, 64 and 65 secured on the base of the main frame 1. The blades of the reversible propeller 61 are adapted to be set at any desired angle on either side of a neutral plane, by means of a horizontally reversing arm 66 which is controlled by an adjusting screw 67 mounted on the rear bearing bracket 63 (see Fig. 7). A sprocket chain 68 runs over the sprocket 55 of the left hand propeller shaft 54 and over a sprocket 69 carried by the main shaft 62. In this way, the long spiral propellers are driven from the main shaft 62.

The elevator propeller which is mounted in and forms a part of the elevator plane is also driven from the main shaft 62, and to this end, the shaft 34 is connected to the said shaft 62 by a flexible shaft 70 (see Figs. 2, 7 and 9). A suitable clutch 71 diagrammatically illustrated in Fig. 7 and controlled by an arm 72 serves to connect the spiral shaft 70 to the driving shaft 62 at will. This arm 72 is shown as provided with a short operating cable 73 which is adapted to be engaged by the hand and which is shown as attached to the steering post 49, but is not controlled by movements thereof, the latter simply serving as a support for the lower rear end of said cable.

The three propellers 53—53 and 61 are arranged to be driven, as shown, by three engines, to-wit, a large explosive engine 74 and two smaller explosive engines 75 and 76. All of these engines are suitably supported from the base of the body frame 1 and the large engine 74 is located on one side thereof while the two small engines 75 and 76 are located on the opposite sides and preferably on the same side as the operator's seat 77.

All of the engines are preferably located in front of the operator's seat.

The crank shaft 78 of the engine 74 is adapted to be connected by an ordinary friction clutch 78a to an axially alined shaft 79 mounted in suitable bearings on the base of the main frame 1 and provided with a sprocket 80. A sprocket chain 81 runs over the sprocket 80 and over the sprocket 82 on the main driving shaft 62. The clutch 78a is adapted to be thrown into and out of action, at will, by a lever 83 which, in turn, is controlled by a foot lever 84 adapted to be operated by the foot of the operator while he is seated on the seat 77.

The crank shafts of the engines 75 and 76 are adapted to be connected, at will, to the carrying shafts of the sprockets 85 and 86, respectively, by horizontal friction clutches 87 and 88. The clutches 87 and 88 are adapted to be controlled respectively by foot levers 89 and 90 which are also within reach of the operator's foot. The said foot levers 89 and 90 are connected to the clutches 87 and 88 through suitable intermediate links and levers 91 and 92 (see Fig. 4).

In the horizontal plane, the outer portions of the frames of the wing planes 17 are tied to the sides of the frame of the elevator plane by cables 93, and to the top of the rudder supporting yoke 14 by cables 94. The tips of the wing frames are tied to the central portion of the arch top of the main frame 1 by cables 95. The front portion of the frame 29 of the elevator plane is tied to the front of the arch top of the body frame 1 by a cable 96, and the intermediate portion of the top of the rudder supporting yoke 14 is tied to the rear portion of the arch top of the body frame 1 by cables 97.

The tips of the wing frames (see Fig. 3) are tied to the truck frame 2 by cables 98 which are detachably connected to the said frame at 99. The front portion of the frame 29 of the elevator plane is tied to the front of the truck frame 2 by a cable 100 detachably connected thereto at 101 (see Fig. 2). In this way, the wing planes, the elevator plane, and the rudder support are thoroughly braced and tied together without requiring any parts of the structure to be heavy.

The body frame 1, it will be further noted, by reference particularly to Figs. 2, 3, 6 and 7, is of peculiar and novel construction, well adapted to withstand torsional or other strains, to-wit, the front and rear end arched ribs 1a thereof are brought downward at the sides in the form of inverted bows 1b of approximately semicircular form and their lower portions are tied together by a transverse rod or tube 1c suitably connected thereto by securing means 1d that is rigidly secured to the body of the truck frame 2.

Operation: As already stated, the aeroplane is driven forward by its three propellers driven either from one, two, or from all three of its engines. The said engines, as noted, can be thrown into action in any order and at any time according to the amount of power required or desired. The long spiral propellers 53 are reversely driven so that the oscillative force thereof will be neutralized and there will be no tendency for the same to rock the machine. They operate immediately below the arched main or center plane 3 and they draw the air under the latter, partly from above and partly from below the elevator plane and thus increase the efficiency of the latter. They carry the air rapidly under the said arched center plane and by centrifugal force throw the blast of air violently upward against the said plane, thereby increasing the carrying efficiency of the said plane. The air blast carried thereby is directly over the head of the operator and is discharged rearward approximately in line with the upper portion of the rudder.

The main propeller 61 to some extent operates in conjunction with the long spiral propellers 53 and to some extent operates independently thereof. Its upper portion assists in blowing the air rearward from the said spiral propeller while its lower portion creates an independent suction and draft below said spiral propellers and it directs the blast of air directly against the front edge portion of the rudder. The rudder is thereby made sensitive and efficient.

The inclination of the elevator plane in front of the hood or center plane will vary the upward or downward travel of the aeroplane and the lifting efficiency thereof may be very greatly increased by starting the elevator propeller into action and then pulling on the cable 40 so as to open or obliquely set the propeller blades 36. On the other hand, when the propeller blades 36 are pulled into oblique positions when the elevator propeller is not driven, the supporting surface of the elevator plane is thereby decreased. This will, therefore, facilitate and accelerate the lowering of the aeroplane.

The propeller incorporated in the elevator plane and for that reason herein designated as the elevator propeller, incorporates the helicopter principles in the aeroplane. It is important, however, to remember that the blades of the elevator propeller are automatically closed so that whenever released, they become parts of the supporting surface of the said elevator plane. To hold the said blades in oblique positions while the elevator propeller is in operation requires a pull or tension on the so-called elevator cable 40.

The arrangement of the long spiral propellers under the central plane or arched hood, with the elevator plane in front of said spiral propellers so that air is drawn from both below and above the same and also the arrangement of the main propeller at the rear of the spiral propellers, and further, the arrangement of the rudder at the rear of the main propeller and somewhat below the spiral propellers, are all features which, severally and combined, give buoyancy and balance to the aeroplane and make the same sensitive to the various devices intended for its control.

The feature of mounting the inner front portions of the wing planes in vertical movements in respect to the body frame is very important and distinguishes the same from prior constructions wherein the wings are rigidly attached to the body frame and require, in warping them, to be distorted and twisted against very considerable resisting force in the wings themselves, and a corresponding tendency to break the wings when given quick and extreme warping movements. With the loose joint connections at the points noted, it is made an easy matter to deflect or vary the angle of the inner front portions of the wings and the objectionable features noted are avoided. It also makes the wing planes very sensitive and responsive so as to control the flight in turning corners, or in going up or descending, or, in other words, enables the operator to hold the balance of the main body of the plane and prevent the same from turning turtle, if the engine should, for some reason, suddenly stop, or from being tipped over by trick winds.

The various levers and devices for controlling the engines are not shown but may be of any of the well known constructions which, however, as well as the foot actuated clutch controlling levers and various other noted controlling devices, will all be preferably located within the reach of the operator seated on the seat 77.

The pivotal connections of the wing planes and of the elevator plane to the body frame enables the same to be thrown upward into vertical positions, simply by detaching the lower ends of their anchoring cables 98 and 100 from the truck frame 2. It is, of course, understood that the double pivotal connections between the said planes and body frame afforded by the links 19 and 43 will permit the said vertical upward movements of the said wings. These adjustments are highly important because, in the first place they permit the aeroplane to be stored in a comparatively small space or inclosure, and in the second place, when the wings are turned up, they permit the aeroplane to be moved along an ordinary road or through gateways and many other places where it would be impossible to move the aeroplane with its wings extended.

What I claim is:

1. An aeroplane having an arched centrally located main plane and wing planes projecting from the opposite sides thereof, of reversely driven spiral propellers located immediately below said main plane, and a third or main propeller located at the rear of and below said reversely driven propellers and said main plane.

2. In an aeroplane, the combination with main supporting planes and propelling means, of an elevator plane having an elevator propeller incorporated therein, the said elevator propeller having adjustable blades movable to and from inclosed positions, and yielding means tending to close said adjustable propeller blades.

3. In an aeroplane, the combination with main supporting planes and propelling means, of an elevator plane having an elevator propeller incorporated therein, the said elevator propeller having adjustable blades movable to and from inclosed positions, yielding means tending to close said adjustable propeller blades, and a connection extending from said elevator propeller for opening the blades thereof.

4. In an aeroplane, the combination with an engine driven propeller for driving the machine forward, of an elevator propeller adjustably mounted as an entirety in front of said propeller so that part of the air will be drawn over and part under said elevator propeller.

5. In an aeroplane, the combination with a wheel equipped truck frame, of a body frame comprising arched ribs and inverted curved side bars united to the arched end ribs of said frame, a cross bar and coöperating means connecting said body and truck frames, supporting planes applied to the said body frame, and means for propelling the same.

In testimony whereof I affix my signatur in presence of two witnesses.

JOHN M. C. BRYANT.

Witnesses:
 GEO. DANA SESSIONS,
 EDWARD P. F. RONAN.